June 24, 1958  E. DURHAM  2,840,043
FLUID HEATER
Filed Feb. 27, 1956

INVENTOR.
Edwin Durham
BY
ATTORNEY

United States Patent Office 2,840,043
Patented June 24, 1958

2,840,043

FLUID HEATER

Edwin Durham, Westfield, N. J., assignor to The Babcock & Wilcox Company, New York, N. Y., a corporation of New Jersey Application February 27, 1956, Serial No. 567,870

5 Claims. (Cl. 122—4)

The present invention relates to vapor generation, and more particularly to a vapor generator wherein a high heat content fuel may be burned to provide hot gases, or a carbon containing gas may be catalytically oxidized and the hot oxidized gas may be used for heating purposes in the generator. Alternately, the hot gases of fuel combustion may be combined with the hot gases resulting from the catalytic oxidation of the carbon containing gas to provide heat for vapor generating purposes.

In the catalytic conversion of hydrocarbons, in, for example, a fluidized bed, the catalyst material loses its activity by being coated with carbonaceous materials during the reaction. The coated catalyst is reactivated by removing the coating in a separate regeneration zone, where the reactivation is accomplished by the introduction of air or other oxygen containing gases. Under the temperature conditions present within the zone, the oxygen will combine the carbon to remove the coating from the catalyst.

The products of combustion resulting from burning off the carbon coating results in production of carbon dioxide and carbon monoxide in a $CO_2/CO$ ratio of from 1.5 to 2 or 1.5 to 1, with the CO percentage in the gases ranging from 5 to 8%. Ordinarily, it is desirable to introduce a deficiency of oxygen into the regeneration zone so that CO is produced rather than $CO_2$. This is desirable since a cubic foot of air combines with approximately twice the amount of carbon when CO is made and the unit is not overloaded with an excess amount of gases, which may lead to a high catalyst loss due to entrainment. In addition, it is important to maintain the temperature of the catalyst in the regenerating zone below an arbitrary maximum temperature of, for example, 1100° F. depending upon the composition of the catalyst. At higher temperatures, the catalyst loses its activity by sintering of the material and is no longer useful in the hydrocarbon reaction zone. The gaseous product is ordinarily incapable of self sustaining combustion, but contains an appreciable amount of sensible heat and combustible matter.

In accordance with my present invention, I provide a vapor generating unit with a water cooled furnace portion. The vapor generator is supported from the top and the water-cooled furnace thereof is positioned upwardly adjacent a catalytic combustion zone wherein the CO gases are converted to $CO_2$ without the addition of other fuels. Between the catalytic combustion zone and the water-cooled furnace of the vapor generator is positioned a shielding screen of vapor generating tubes which protects the catalyst in the catalytic combustion zone from destructive overheating by transmission of radiant heat from the high heat value fuel burned in the adjoining water cooled furnace.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 1:
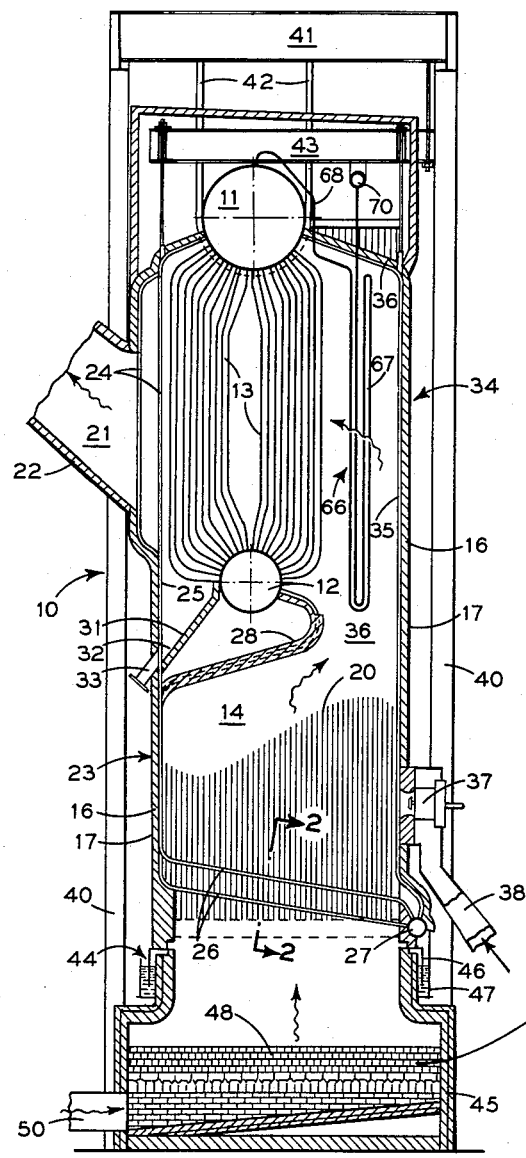
Fig. 1 is a section elevation of a vapor generating unit constructed and arranged in accordance with the invention.

In the embodiment of the invention shown in the drawings, the vapor generating unit is arranged for pressure firing. The unit is constructed and arranged to be used either as a power generator fired by conventional fuels, or as a waste heat vapor generator supplied with hot gases resulting from the catalytic conversion of carbon containing gases, or both sources of hot gas can be used simultaneously.

Referring to Fig. 1, the invention is illustrated as applied to a two-drum steam boiler 10. The upper and lower drums 11 and 12, respectively, are connected by rows of vapor generating tubes 13 forming the convection heating banks of the boiler. The lower portion of the casing enclosing the boiler 10 is extended to provide a furnace portion 14 where both the furnace and the convection portion of the unit are provided with rows of vapor generating tubes lining the walls of the enclosure. Outwardly of the wall tubes, refractory and insulating materials 16 are installed with an exterior metallic casing 17 forming a substantially gas tight enclosure suitable for pressure operation of the unit.

The side walls 18 of the unit are lined by generally upright vapor generating tubes 20 which are arranged in side by side substantially tangential relationship in the lower portion thereof, while the upper portion of the enclosure is lined by more widely spaced tubes. With the arrangement, some of the lower side wall tubes open at their upper ends into the lower drum 12 of the boiler. The casing is provided with a gas outlet opening 21 on the rearward side of the enclosure so that the gases of combustion leaving the unit may be passed through a refractory lined duct 22 for discharge to an economizer or other heat recovery apparatus (not shown), as desired, and thereafter, to the atmosphere.

The rear wall 23 of the vapor generating enclosure is provided with transversely spaced upright vapor generating tubes 24 in its upper portion so as to permit discharge of heating gases from the convection tube banks 13 into the outlet opening 21. The tubes 24 open at their upper ends into the drum 11. In the lower furnace portion 14 of the setting, the rear wall is provided with additional tubes 25 which open at their upper ends into the lower drum 12, and are so spaced in relationship to the tubes 24 as to form a substantially tangential arrangement of tubes in the furnace portion 14 of the setting. The tubes 24 and 25 in the rear furnace wall are extended in a forwardly and downwardly inclined direction in spaced rows 26 to open into a lower, horizontally positioned transverse header 27. The tube rows provide a water-cooled screen for the protection of catalyst elements positioned beneath the furnace 14 of the vapor generating unit, as hereinafter described.

The upper end portion of the rear wall tubes 25 opening to the lower drum are substantially reversely bent to form a nose baffle 28 at the upper end of the furnace 14 and to define one side of a gas discharge opening 30 from the furnace 14 upwardly into the convection heating tubes 13 of the boiler 10. On the rearward side of the lower drum 12 is provided a dust hopper 31 which is formed by a downwardly and rearwardly inclined refractory member 32 extending from side wall to side wall 18 and from the lower segment of the drum 12 to the rear wall 23 of the setting. An outlet duct 33 is conveniently provided to connect the dust hopper 31 with any convenient external means for the removal and disposal of the dust collected in the hopper.

The forward or front wall 34 of the furnace 14 is substantially upright with the tubes 35 opening at their lower ends into the transverse header 27 while the upper end portions of the tubes are upwardly and rearwardly inclined to open into the upper drum 11 and to form a portion of the roof 36 of the boiler setting. One or more burners 37 are positioned to discharge a high heat content fuel through the front wall 34 into the furnace 14. As shown in the drawing, the fuel burner 37 is illustrated as being the liquid fuel type, although gaseous fuel may also be used to provide the furnace 14 with high heat content fuel. Combustion air is supplied to the burners 37 from an outside source, not shown, through a duct 38 at super-atmospheric pressure.

As shown in the drawings, the embodiment of the invention includes means for supporting the vapor generator from structural steelwork so that the thermal expansion and contraction of the vapor confining elements of the boiler is in a vertical direction from a fixed overhead position. The structural support includes upright columns 40 at the corners of the unit, and an upper transverse beam 41 to which the upper drum 11 is directly supported by hangers 42. A second horizontal beam 43 is supported from the beam 41 and in turn, is connected with the tubes lining the walls of the unit, whereby the fluid cooled elements of the boiler are top supported.

The lower ends of the walls of the boiler are provided with a flexible connection 44 forming a gas seal between the pressure parts of the boiler and a refractory enclosure 45 positioned immediately below the tube rows 26 of the furnace 14. The seal illustrated includes a depending flange 46 supported from the walls of the furnace 14 and having its lower end portion projecting into a container 47 of liquid, where the container is supported on the refractory enclosure 45. The refractory enclosure 45 is filled with a mass of oxy-catalyst elements 48 through which carbon containing gases are passed for the conversion of the gas to carbon dioxide. The refractory enclosure is provided with a gas inlet duct 50 through which the carbon containing gas from a hydrocarbon regenerator unit is passed.

Figure 3:
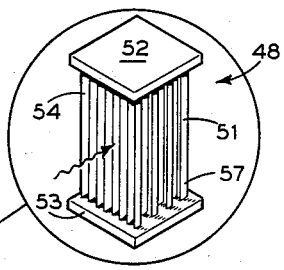
Fig. 3 is an enlarged perspective view of one of the catalyst elements shown in Fig. 1.

The oxy-catalyst elements 48 installed in the refractory enclosure 45 consists of a multiplicity of individual blocks arranged side by side in a plurality of rows so that the gases pass upwardly therethrough with the carbon containing gases converted to carbon dioxide with the generation of heat, and the hot gases thereafter passed upwardly through the tube rows 26 into the furnace 14. As shown in Fig. 3, each individual oxy-catalyst element 48 is formed as a plurality of closely spaced inert refractory tubes or rods 51 coated with an external catalytic film such as platinum, or a mixture of platinum and aluminum oxide. The rods 51 extend between refractory end plates 52 and 53 and each rod is of elongated or generally oval cross section. The rods 51 are arranged in rows 54–57, with the greater length of the cross-section in parallel planes normal to the row of rods. Adjacent rows of rods are staggered so that gases passing between the rods in one row strikes the rods in the adjacent row. The spacing between the rods in each row, and between the rows of rods, is such that the gases passing through an element 48 follows a sinuous flow path and none of the gases pass in a straight path through the catalyst elements.

The catalytic films are effective in converting carbon monoxide gases, at a temperature of the order of 750° F. or above, into carbon dioxide at a temperature of from 1450 to 1750° F. leaving the elements 48. The temperature of the gases leaving the element is, of course, dependent upon the amount of CO gases present and upon the availability of sufficient oxygen to complete the reaction.

While the oxy-catalyst elements 48 are extremely effective within the temperature ranges described, the elements will lose their catalytic effect if they are exposed to temperatures in excess of approximately 1800°. In the arrangement hereinbefore described, the combustion of high heat content fuels, such as fuel oil, in the furnace 14 creates temperatures considerably above the 1800° limit of the oxy-catalyst elements. Therefore, it is essential that the elements 48 be shadowed or screened against the transmission of radiant heat from the high temperature flame created by fuel oil combustion in the furnace 14.

Figure 2:
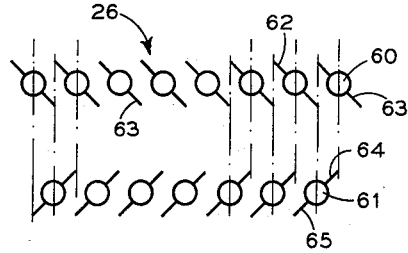
Fig. 2 is an enlarged section of a portion of the apparatus shown in Fig. 1 taken on the line 2—2.

As shown in Fig. 1, the screening of the elements 48 according to the present invention is accomplished by vertically spaced rows 26 of tubes where the tubes of each row are spaced to provide a flow path for the gases moving upwardly from the oxy-catalyst elements 48. As shown in Fig. 2, each of the tubes 60 in the upper row is provided with a radially extending fin 62 which projects upwardly and longitudinally of the tube for the full width of the furnace 14. A similar fin 63 extends downwardly of each tube 60 from the opposite side of the tube wall and both fins are inclined with respect to the direction of gas flow through the screen so that the fins of adjacent tubes on the same row essentially overlap to avoid direct transmission of radiant heat downwardly from the furnace 14. To insure adequate shadowing or screening of the oxy-catalyst elements the tubes 61 in the lower row are staggered with respect to the tubes 60 and the fins 64 and 65 on the row of tubes 61 are inclined in opposite directions from the inclination of the fins 62 and 63. The arrangement is extremely effective in protecting the oxy-catalyst elements 48 and at the same time provides a minimum obstruction to the movement of gases upwardly through the spaced rows 26 so that a minimum pressure drop in movement of the gases through the furnace is involved.

In operation, a unit of the type described was initially fired by fuel oil and produced a steam output of 60,000 pounds per hour. At a later date, CO gas from a regenerating zone was passed through the duct 50 to the oxy-catalyst elements 48 in an amount equal to 216,000 pounds per hour and at a temperature of 850° F. The gas was converted to carbon dioxide and was passed into the furnace 14 at a temperature of approximately 1750° F. to produce over 60,000 pounds of steam per hour without the addition of any high heat content fuel to the furnace 14. The gas from the hydrocarbon regenerator, while having a relatively high sensible heat contained only about 20 B. t. u. per cu. ft. of gas from combustibles therein.

The installation of a steam superheater in a boiler of the type described is dependent upon the particular plant steam requirements. A suitable superheater arrangement, when required, is illustrated in Fig. 1, where a pendant superheater 66 is supported by the beam 43. As shown the tubular elements 67 of the superheater are supplied with saturated steam through the conduits 68 from the drum 11, and the superheated steam is collected in the header 70 for discharge to the point or points of use.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A fluid heater comprising walls defining a fluid cooled furnace, means for burning high heat content fuel in said furnace, walls defining an enclosure positioned below said fluid cooled furnace and opening upwardly thereto, means forming catalytic elements in said enclosure, means for passing a low heat content carbon containing gas upwardly through said catalytic elements to oxidize the carbon containing gas and to raise its temperature, and means shielding said catalytic elements from destructive radiant heat effects caused by the combustion of said high heat content fuel in said fluid cooled furnace.

2. A fluid heater comprising walls defining a fluid cooled furnace, means for burning high heat content fuel in said furnace, walls defining an enclosure positioned below said fluid cooled furnace and opening upwardly thereto, rows of catalytic elements disposed in said enclosure, means for passing a low heat content carbon containing gas upwardly through said catalytic elements to oxidize the carbon containing gas and to raise its temperature for delivery to said fluid cooled furnace, and fluid cooled means positioned in the bottom portion of said fluid cooled furnace shielding said catalytic elements from destructive radiant heat effects caused by the combustion of said high heat content fuel in said fluid cooled furnace.

3. A vapor generator comprising walls defining a furnace, vapor generating tubes in the walls of said furnace, means for burning a high heat content fuel in said furnace, walls defining an enclosure positioned below said furnace and opening upwardly thereto, rows of catalytic elements disposed across said enclosure, means for passing a low heat content carbon containing gas upwardly through said catalytic elements to oxidize the carbon containing gas and to raise its temperature for delivery to said furnace, and vertically spaced rows of vapor generating tubes in horizontally staggered relationship positioned adjacent the upper end portion of said enclosure for shielding said catalytic elements from destructive radiant heat effects caused by burning said high heat content fuel in said furnace.

4. A vapor generator comprising walls defining a fluid cooled furnace, means for burning a high heat content fuel in said furnace, walls defining an enclosure positioned below said fluid cooled furnace and opening upwardly thereto, catalytic elements disposed in said enclosure, means for passing a low heat content carbon containing gas upwardly through said catalytic elements to oxidize the carbon containing gas and to raise its temperature for delivery to said fluid cooled furnace, and means for shielding said catalytic elements from destructive radiant heat effects caused by the combustion of said high heat content fuel in said fluid cooled furnace including vapor generating tubes extending across said furnace upwardly adjacent said catalyst elements, continuous fins welded longitudinally of said tubes and canted at an angle to the horizontal plane of each tube axis.

5. A vapor generator comprising walls defining a furnace, vapor generating tubes in the walls of said furnace, means for burning a high heat content fuel in said furnace, walls defining an enclosure positioned below said furnace and opening upwardly thereto, rows of catalytic elements disposed across said enclosure, means for passing a low heat content carbon containing gas upwardly through said catalytic elements to oxidize the carbon containing gas and to raise its temperature for delivery to said furnace, vertically spaced rows of vapor generating tubes in horizontally staggered relationship positioned adjacent the upper end portion of said enclosure for shielding said catalytic elements from destructive radiant heat effects caused by the combustion of said high heat content fuel in said furnace, and longitudinal fins welded on opposite sides of each of the tubes shielding said catalytic elements, said fins being inclined from the horizontal plane of the tube axes in each tube row whereby the space between adjacent fins is at least equal to the intertube space between adjacent tubes in each row.

References Cited in the file of this patent

UNITED STATES PATENTS

| | | |
|---|---|---|
| 1,709,950 | Reese | Apr. 23, 1929 |
| 2,077,410 | Harter et al. | Apr. 20, 1937 |
| 2,143,820 | Payn | Jan. 10, 1939 |
| 2,634,232 | Houdry | Apr. 7, 1953 |

FOREIGN PATENTS

| | | |
|---|---|---|
| 152,939 | Australia | Aug. 24, 1953 |